(12) United States Patent
Kim

(10) Patent No.: US 7,971,713 B2
(45) Date of Patent: Jul. 5, 2011

(54) CONTAINER FOR SHIPPING VEHICLES, INCLUDING EXTENSION PLATE

(76) Inventor: Jum-gyu Kim, Seoul (KR)

( * ) Notice: Subject to any disclaimer, the term of this patent is extended or adjusted under 35 U.S.C. 154(b) by 44 days.

(21) Appl. No.: 12/086,727

(22) PCT Filed: Dec. 18, 2006

(86) PCT No.: PCT/KR2006/005523
§ 371 (c)(1), (2), (4) Date: Jun. 18, 2008

(87) PCT Pub. No.: WO2007/073069
PCT Pub. Date: Jun. 28, 2007

(65) Prior Publication Data
US 2009/0166231 A1    Jul. 2, 2009

(30) Foreign Application Priority Data

Dec. 19, 2005 (KR) .................. 10-2005-0125475

(51) Int. Cl.
*B65D 85/68* (2006.01)
*B60P 3/07* (2006.01)
*B60P 7/06* (2006.01)
(52) U.S. Cl. ............ 206/335; 220/1.5; 410/4; 410/46
(58) Field of Classification Search .......... 206/335; 220/1.5; 108/51.1, 54.1, 55.1, 55.3, 55.5; 410/46, 77, 80, 82, 84, 3–4
See application file for complete search history.

(56) References Cited

U.S. PATENT DOCUMENTS

| 5,706,738 | A  | * | 1/1998  | Rapeli ................ 108/54.1 |
| 6,227,397 | B1 | * | 5/2001  | Kim .................... 220/1.5 |
| 6,655,300 | B1 |   | 12/2003 | Clive-Smith et al. |
| 7,011,479 | B2 | * | 3/2006  | Sain ................... 410/46 |
| 7,018,150 | B2 | * | 3/2006  | Kim .................... 410/46 |
| 7,040,848 | B2 | * | 5/2006  | Sain ................... 410/46 |
| 7,118,314 | B2 | * | 10/2006 | Zhou et al. ........... 410/84 |
| 7,125,212 | B2 | * | 10/2006 | Moore et al. .......... 410/46 |
| 7,140,821 | B2 | * | 11/2006 | Sain ................... 410/46 |
| 7,252,468 | B2 | * | 8/2007  | Moore et al. .......... 410/46 |

FOREIGN PATENT DOCUMENTS

| DE | 92 14 306 U1 | 6/1993 |
| DE | 197 30 165 A1 | 1/1999 |
| GB | 2 345 282 B1 | 7/2000 |
| JP | 59112787 U | 7/1984 |
| KR | 20-0285401 | 7/2000 |
| KR | 20000015443 U | 7/2000 |

* cited by examiner

Primary Examiner — Bryon P Gehman
(74) Attorney, Agent, or Firm — Ware, Fressola, Van der Sluys & Adolphson, LLP

(57) ABSTRACT

In a container for shipping vehicles, a bottom plate is provided having a predetermined length and a predetermined width satisfying standards of a conventional container holder. Support poles are installed on four corners of the bottom plate and include corner casts on upper portions thereof. An extension plate extends from a side of the bottom plate and supports vehicles so that vehicles can be loaded in the width direction of the bottom plate.

5 Claims, 14 Drawing Sheets

US 7,971,713 B2

CONTAINER FOR SHIPPING VEHICLES, INCLUDING EXTENSION PLATE

TECHNICAL FIELD

The present invention relates to a container for shipping vehicles, and more particularly, to a container for shipping vehicles, which can be used in a conventional container holder and can maximize a utilization of shipping space.

BACKGROUND ART

In general, shipping containers, which are box-shaped transport equipment having a large capacity, in which cargo can be loaded, are widely used to load cargo in the field of shipment of goods, and can be fabricated according to predetermined standards in order to be used in combination with one or more transportation means.

Referring to FIG. 1, a conventional standardized container 1 is guided and supported by a container holder 2 installed in a cargo ship, and then, stacked with other containers to transport huge amounts of cargo.

The container holder 2 divides the interior of a ship into units having a size corresponding to standardized containers 1, and includes a barrier rib 3 guiding a container 1 so that a plurality of containers 1 can be stacked and fixed in the ship, and division plates 4 installed on the barrier rib 3 and located between the containers 1 to prevent the containers 1 from moving from a predetermined arrangement.

Therefore, as shown in FIG. 1, the container 1 is descended from an upper portion of the container holder 2 while being guided between the barrier rib 3 and the division plates 4, and then, is stacked on the bottom 5 of the ship.

The conventional container 1 is a unit for loading and unloading operations performed by conveying equipment such as a crane (not shown), and a unit of transportation using container vehicles (not shown). Therefore, the container 1 is very useful in the field of transportation of a huge amount of goods using ships and vehicles.

However, the conventional container 1 is standardized in length (L) (about 12.19 m), width (W) (about 2.43 m), and height (H) (about 2.59 m) for general goods, and thus, is not suitable for vehicles, which generally have lengths of 5 m or less, widths of 2.4 m or less, and heights of 1.7 m or less.

Therefore, in order to transport a large amount of vehicles using ships, an additional vehicle transporting ship (not shown) including multi-layered parking regions, in which a huge amount of vehicles can be parked at the same time, is used.

Referring to FIG. 2, in order to transport the small number of vehicles 6 such as a few used cars, the vehicles 6 are loaded in a length direction of the container 1 being of the conventional standard, and vehicle racks 7 can be installed for utilizing empty upper space in the container 1.

That is, as shown in FIG. 3, when the vehicles 6 are transported using the conventional container 1, dead space (D) is generated in the container 1, and thus, the number of vehicles 6 that can be loaded in the same space is reduced. In particular, as shown in FIGS. 2 and 3, if the vehicle 6 is loaded on the vehicle rack 7 in the conventional container 1, it is difficult to install and release the vehicle rack 7 inside the container 1. In addition, it is also difficult to load and draw the vehicle 6 onto/from the installed vehicle rack 7, and thus, it takes a long time to handle the vehicles 6 and a lot of operating workers are required. Moreover, the operating worker may be accidentally hit by the vehicle 6 during the operation, or the vehicle 6 and inner wall of the container 1 may collide with each other so that the vehicles 6 may become scratched.

In addition, during moving of the container 1, in which the vehicles 6 are loaded, the vehicles 6 may be damaged by the movement of the container 1. During transporting of the container 1 in the ship, it is difficult to support the vehicles 6, and thus, the vehicles 6 may be damaged by rolling of the ship. Therefore, the container 1 cannot be applied to transport new cars, and it is mainly used to transport used cars.

Meanwhile, the transportation of a huge amount of vehicles using the vehicle transporting ship has some problems. For example, since the conventional container 1 that is widely distributed cannot be used, an expensive vehicle transporting ship must be used, and thus, costs for transporting vehicles and costs for using the ship are high. In addition, since the shipping schedule is limited, it is not suitable for transporting a small number of vehicles. Even if the vehicles 6 are parked as close to each other as possible by skilled parking workers, a lot of dead space is generated above the vehicles 6. In addition, wasted space generated due to poles, vehicles parked at corners, or a structure of the parking lot, and a lot of skilled workers and time are required to load the vehicles in the vehicle transporting ship.

Also, prior to loading the vehicles into the vehicle transporting ship, the vehicles must stand-by in a vast space because there is no structure for stacking the vehicles. Therefore, a vast space for parking the stand-by vehicles is required when the vehicles are shipped/unshipped into/from the vehicle transporting ship.

DETAILED DESCRIPTION OF THE INVENTION

Technical Problem

Figure 1:
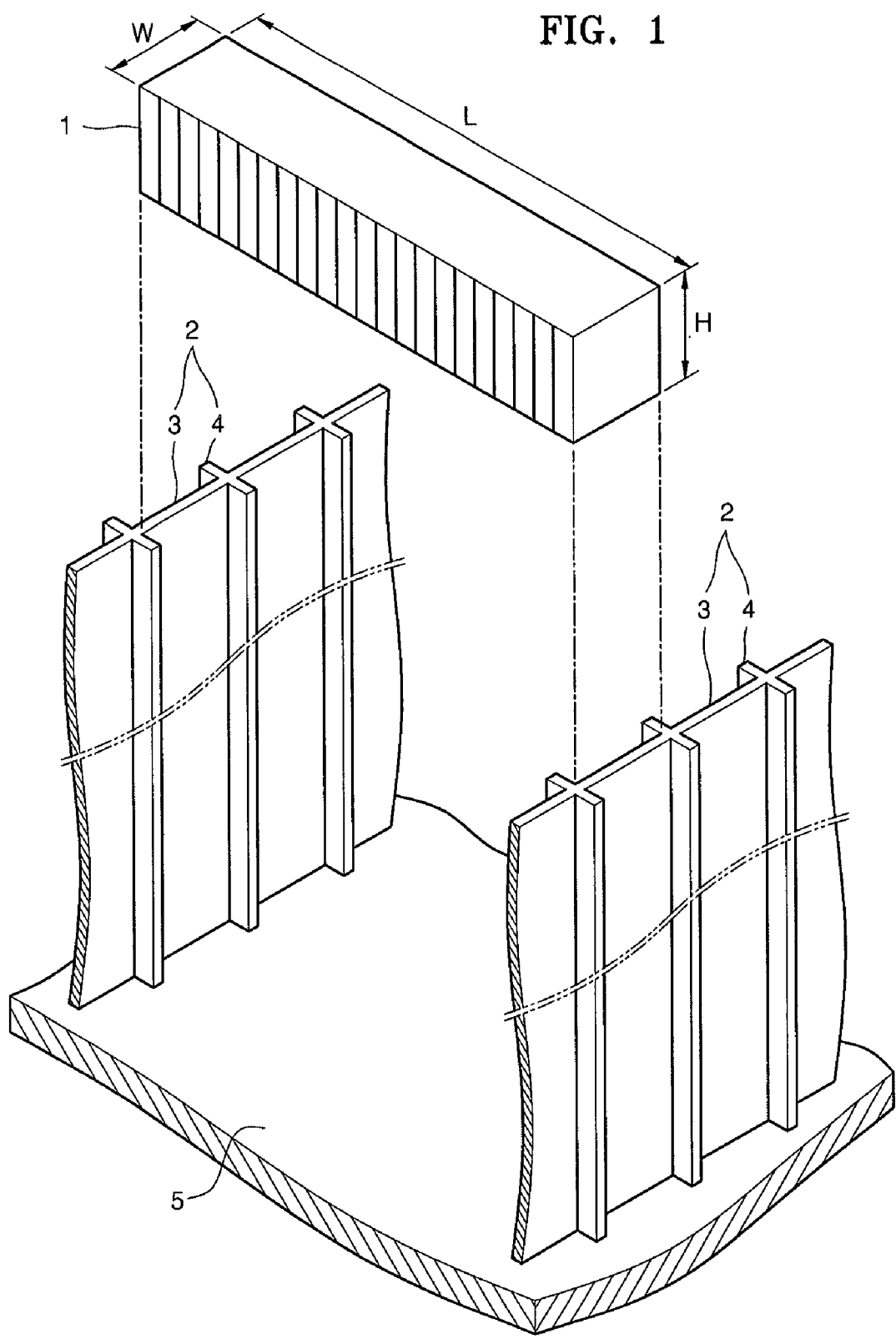
FIG. 1 is a perspective view of a container and a container holder in a state where the container is being loaded into the container holder according to the conventional art.

The present invention provides a container for shipping vehicles, which is capable of maximizing the utilization of space and loading vehicles onto conventional container ships, and thus, transporting of both a small amount of vehicles and a massive amount of vehicles can be performed at low cost.

The present invention also provides a container for shipping vehicles using a simple method so that the amount of operating workers and time can be reduced greatly in loading and unloading the vehicles.

The present invention also provides a container for shipping vehicles, which can support the vehicles firmly to prevent the vehicles from being damaged and can be used to load various standards of vehicles such as used cars, new cars, and specialized vehicles by adjusting movable poles or the number of vehicles.

The present invention also provides a container for shipping vehicles, which can be used as a container for general goods by extending or contracting movable poles and by receiving or folding extension plates. A volume of the container can be minimized when it is not used and the container can have a stable structure, and thus, the container can be used, kept, and transported easily and the durability of the container can be improved.

The present invention also provides a container for shipping vehicles, which can be stacked in a multi-layered stack with vehicles therein before loading or after unloading, and thus, reducing an area required for vehicle parking space before shipping the vehicles and after unshipping the vehicles.

Technical Solution

According to an aspect of the present invention, there is provided a container for shipping vehicles, the container including: a bottom plate having a predetermined length and a predetermined width satisfying standards of a conventional container holder, support poles installed on four corners of the bottom plate, and including corner casts on upper portions thereof; and an extension plate extending from a side of the bottom plate so that vehicles can be loaded in the width direction of the bottom plate, and extending an overall width of the container.

Each of the support poles may include: a fixed pole installed on the bottom plate; and a movable pole installed in the fixed pole, and guided by the fixed pole to extend to a desired length and contract based on the fixed pole.

The support poles may be folded in the width direction of the bottom plate by being coupled to the bottom plate using hinges, and overlap with each other.

The extension plate may be slid along a guide recess formed on the bottom plate so as to be received in the bottom plate. The extension plate may be coupled to the bottom plate using a hinge so as to rotate and fold onto the top of the bottom plate.

The extension plate includes a thickness reinforcing portion in order to reinforce a strength of the extension plate. The extension plate may include a projection bar, an end portion of which is coupled to the extension plate using a hinge, supporting the extension plate due to the other end of the projection bar making contact with a projection step when the extension plate is drawn.

Advantageous Effects

As described above, according to the container for shipping vehicles of the present invention, the utilization of space can be maximized, vehicles can be transported easily at low cost, operating workers and operating time can be reduced greatly when shipping, loading, and unloading the vehicles. In addition, during loading and transporting of the vehicles, scratches on the vehicles or damage to the vehicles can be prevented, and various types of vehicles can be transported using the container of the present invention. Also, the container of the present invention can be used as a container for shipping general goods, and a volume of the container can be minimized when it is not in use. In addition, an area required for parking the vehicles before shipping or after unshipping the vehicles can be reduced greatly.

Mode of the Invention

Hereinafter, a container for shipping vehicles according to embodiments of the present invention will be described in detail with reference to accompanying drawings.

Figure 4:
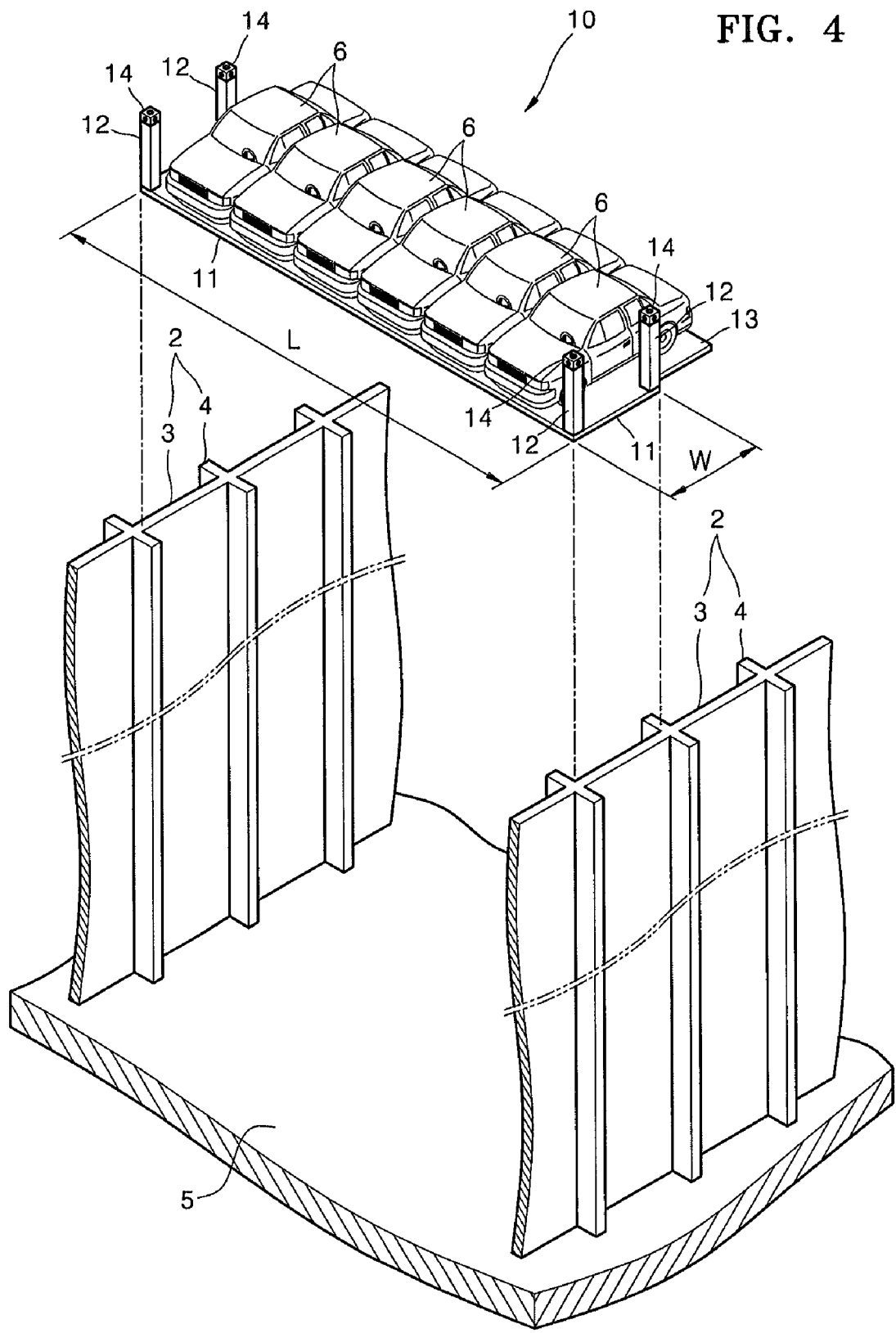
FIG. 4 is a perspective view of a container for shipping vehicles and a container holder in a state where the container is being loaded into the container holder according to an embodiment of the present invention.
Figure 5:
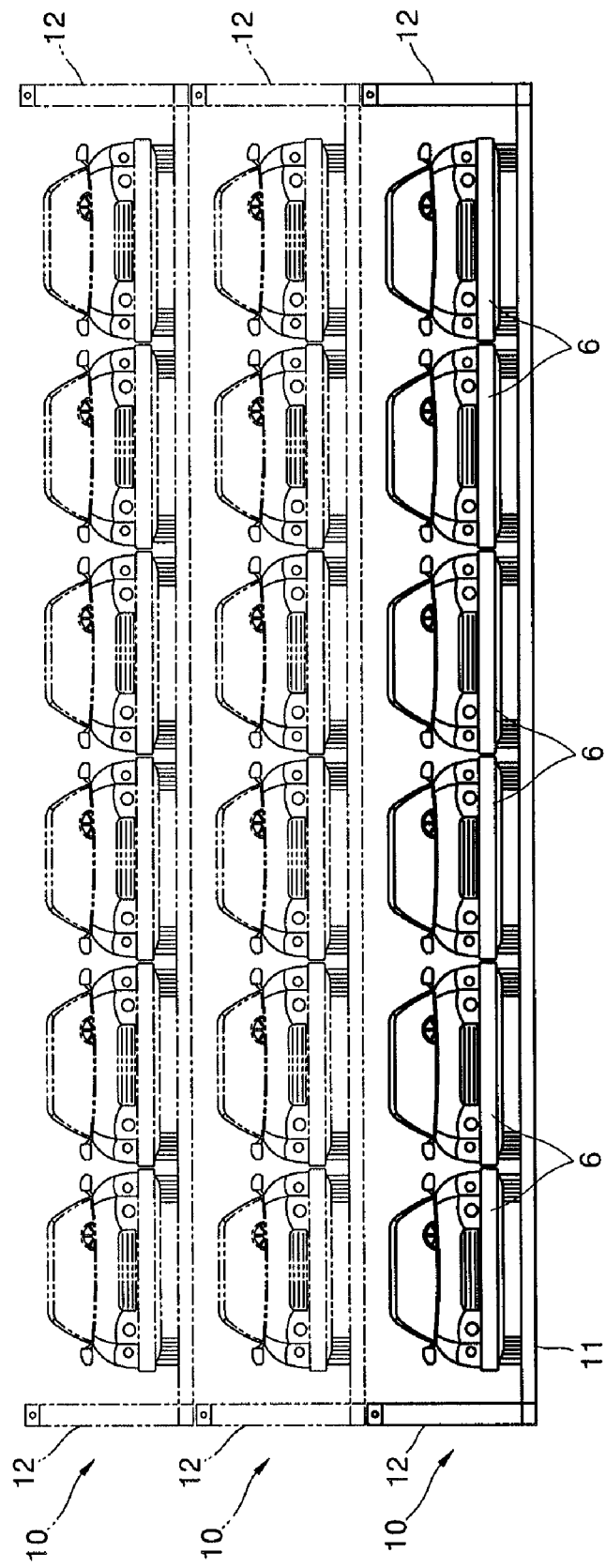
FIG. 5 is a side sectional view of the container for shipping vehicles shown in FIG. 4, in which vehicles are loaded in a width direction of the container.
Figure 6:
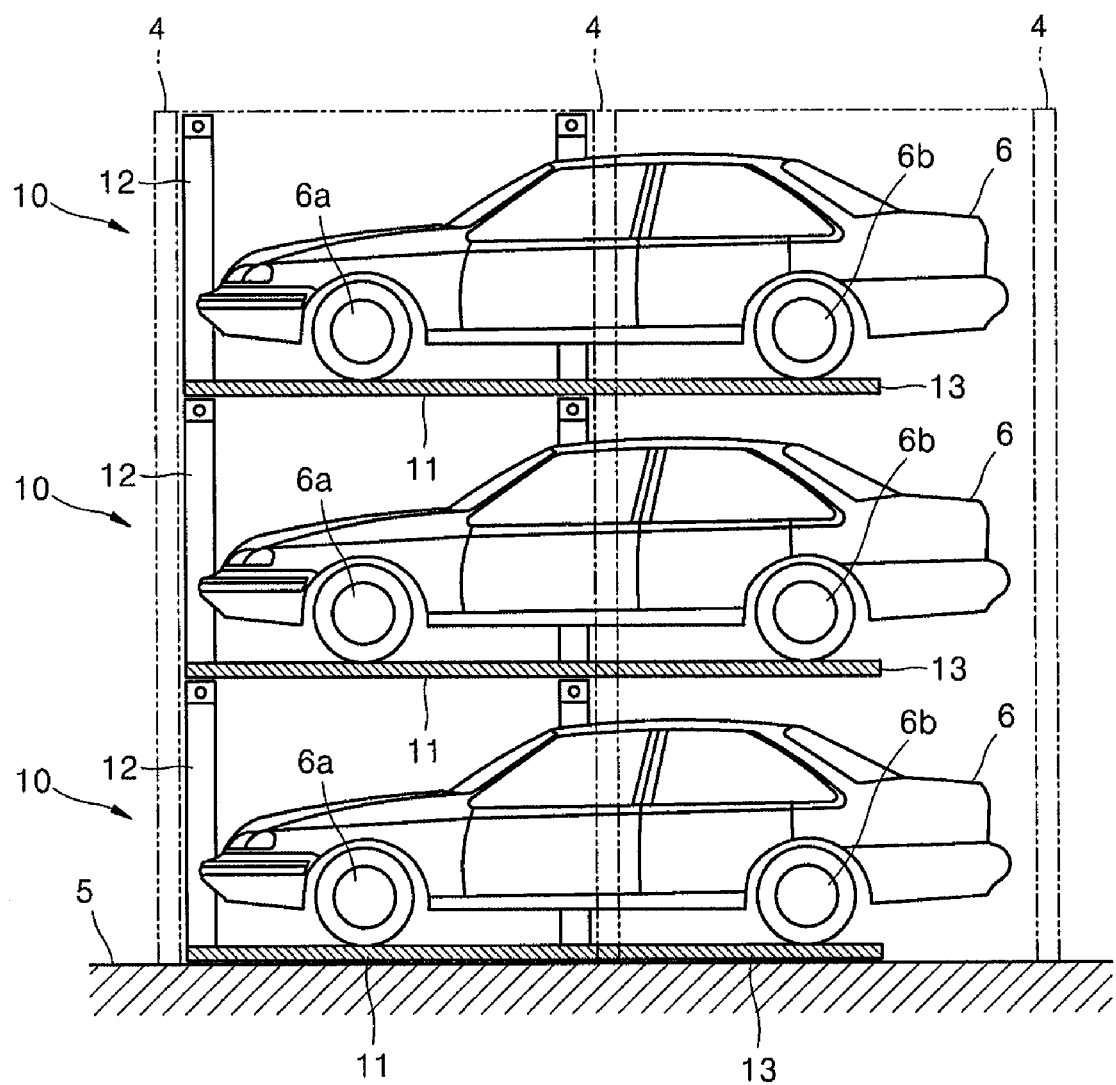
FIG. 6 is a front sectional view of the container for shipping vehicles shown in FIG. 4.

As shown in FIGS. 4, 5, and 6, a container 10 for shipping vehicles according to an embodiment of the present invention is a container which can receive vehicles therein in order to ship the vehicles, and includes a bottom plate 11, support poles 12, and an extension plate 13.

Here, referring to FIG. 4, the bottom plate 11 has a predetermined length (L) and a predetermined width (W) according to the standard of a container holder installed in ships for transporting general goods. That is, the bottom plate 11 may be fabricated to be suitable for the conventional container holder 2 installed in ships for transporting general goods so that the container for shipping vehicles can be shipped in a conventional container ship.

In addition, the support poles 12 are installed on four corners of the bottom plate 11. When the containers 10 of the current embodiment are stacked in a multi-layered arrangement, the support poles 12 support the loads of the containers 10, and furthermore, include corner casts 14 on upper ends thereof so that the container 10 can is be transported using a crane.

Here, a height of each of the support poles 12 may correspond to a height of the vehicle 6 to be transported, or may be adjustable. In a case where the height is designed to correspond to the height of the vehicle 6, the height is much lower than that of the conventional container 1, and thus, more containers 10 can be stacked in comparison to the conventional container 1. In addition, dead space above the loaded vehicle 6 can be minimized, and thus, the space that each container 10 takes up can be utilized well.

In particular, the extension plate 13 of the current embodiment allows the vehicles 6 to be loaded in a width direction of the bottom plate 11, and is installed on a side of the bottom plate 11. The extension plate 13 extends the width of the bottom plate 11 so that rear wheels of the vehicle 6 can be mounted on the extension plate 13 when front wheels of the vehicle 6 are mounted on the bottom plate 11. Therefore, as shown in FIG. 4, when the vehicles are loaded on the container 10 for shipping vehicles of the current embodiment, the container 10 occupies two sections of the container holder 2.

Figure 2:
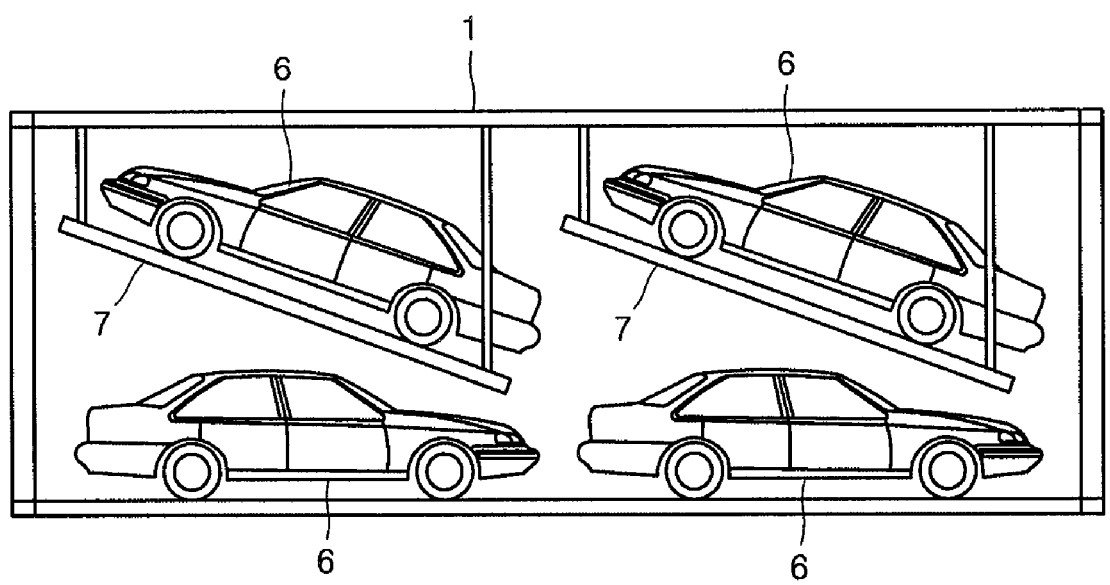
FIG. 2 is a side sectional view of the conventional container, in which vehicles are loaded in a length direction of the container.
Figure 3:
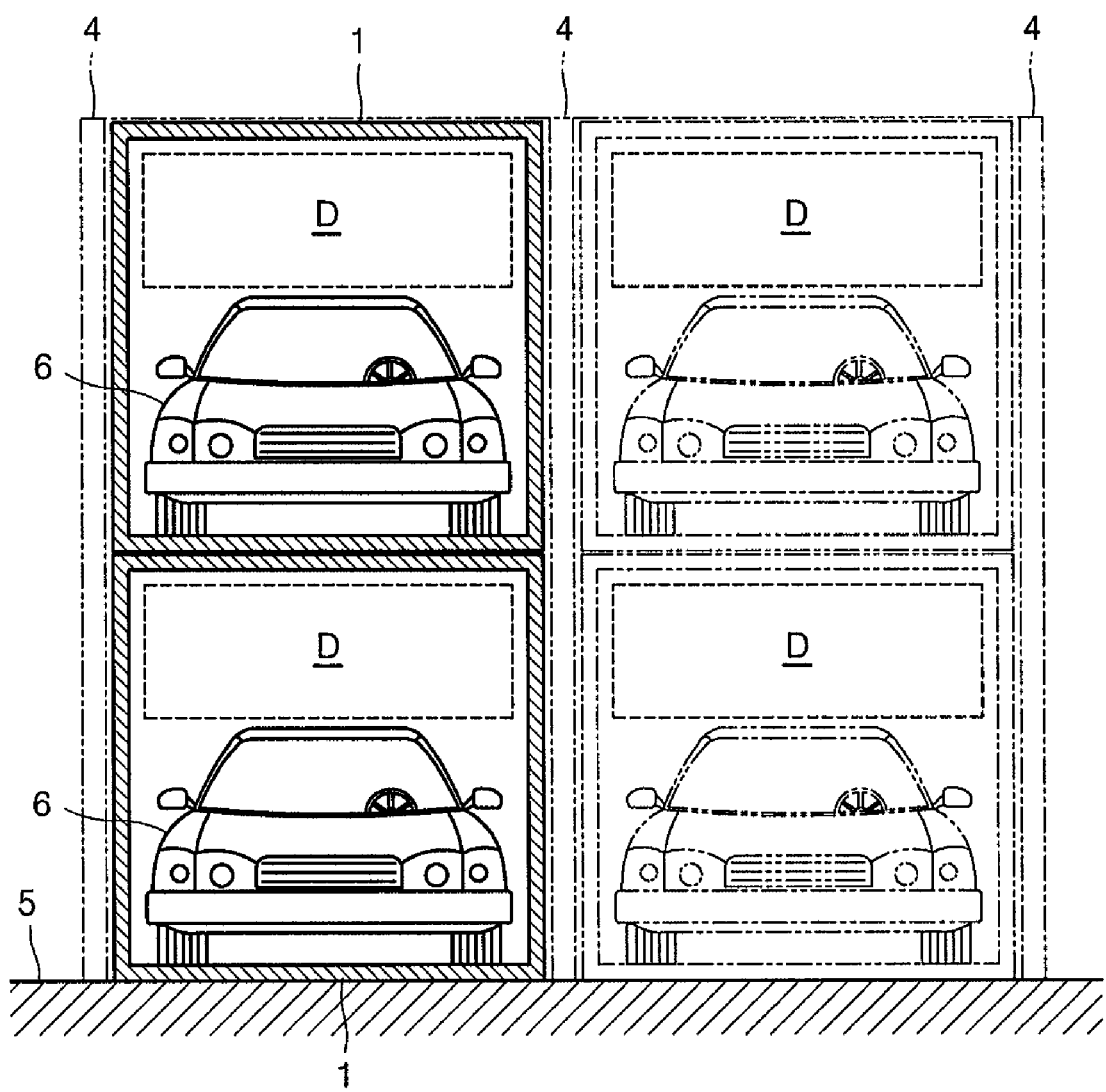
FIG. 3 is a front sectional view of the container of FIG. 2.

However, the conventional container 1 having length of 12.19 m, width of 2.43 m, and height of 2.59 m as shown in FIG. 1 can receive four vehicles as shown in FIG. 2. Then, a total of four containers 1 stacked in two layers in two sections of the container holder 2 can receive sixteen vehicles using the conventional container 1, as shown in FIG. 3. On the other hand, according to the container 10 of the current embodiment, since three layers of containers 10 can be stacked within the height of two conventional containers 1, six vehicles 6 in each layer and eighteen vehicles 6 in the three layers of the container holder 2 can be loaded as shown in FIG. 5. Therefore, two additional vehicles 6 can be further loaded in the same space as that of the conventional art, and the difference becomes larger when more containers 10 are stacked. Thus, the number of vehicles that can be loaded in the same space can be greatly increased (here, the vehicle generally has a length of 5 m or shorter, a width of 2.4 m or smaller, and a height of 1.7 m or lower, and most of vehicles can be included in this range).

Therefore, the dead space (D) can be minimized when compared to that of the conventional container 1 receiving vehicles 6. In addition, conventional ships that are widely distributed as cargo ships can be used to transport vehicles, and thus, a small amount of vehicles or a huge amount of vehicles can be transported easily at low cost.

Moreover, the conventional vehicle rack that is installed to load the vehicle in the conventional container is not required. In addition, as shown in FIG. 6, front wheels 6a of the vehicle 6 are supported by the bottom plate 11 and the rear wheels 6b of the vehicle 6 are supported by the extension plate 13, and thus, the vehicle 6 can be firmly supported. Therefore, scratches or damage to the vehicle 6 that can occur during loading, unloading, shipping, and transporting of the vehicles can be prevented, and the height of the support pole 12 or the number of vehicles that are to be transported can be freely adjusted so that vehicles of various sizes can be loaded.

Figure 7:
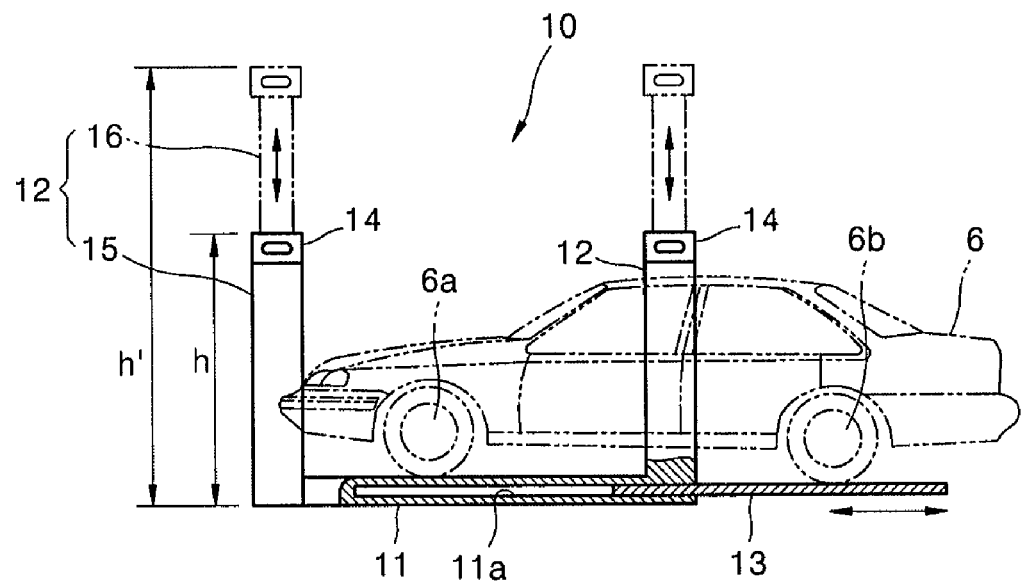
FIG. 7 is a front sectional view of the container for shipping vehicles according to another embodiment of the present invention.
Figure 8:
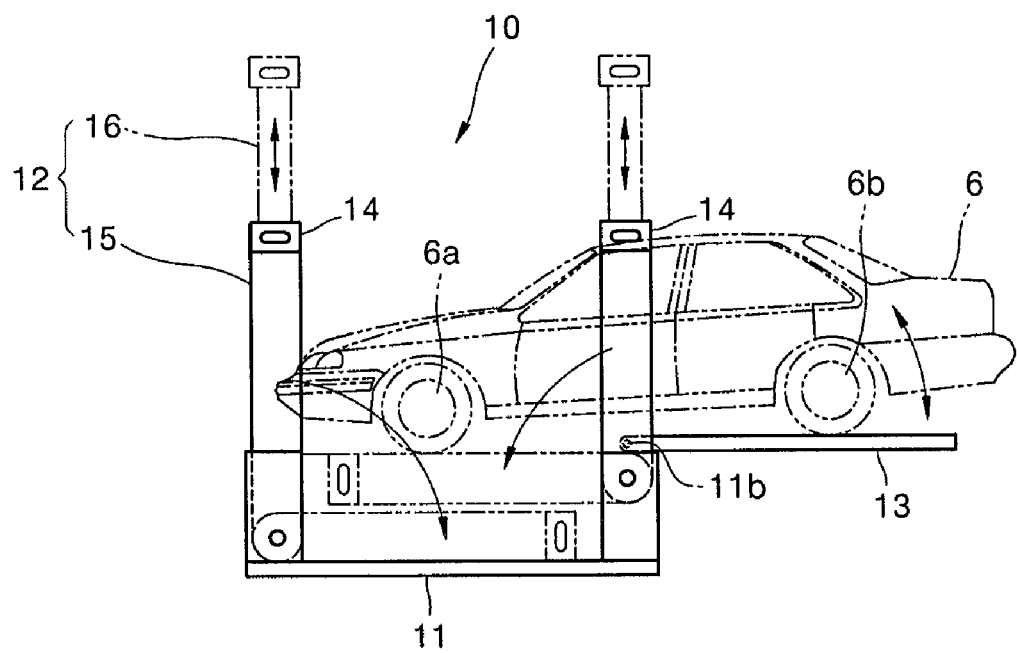
FIG. 8 is a front sectional view of a container for shipping vehicles according to another embodiment of the present invention.
Figure 9:
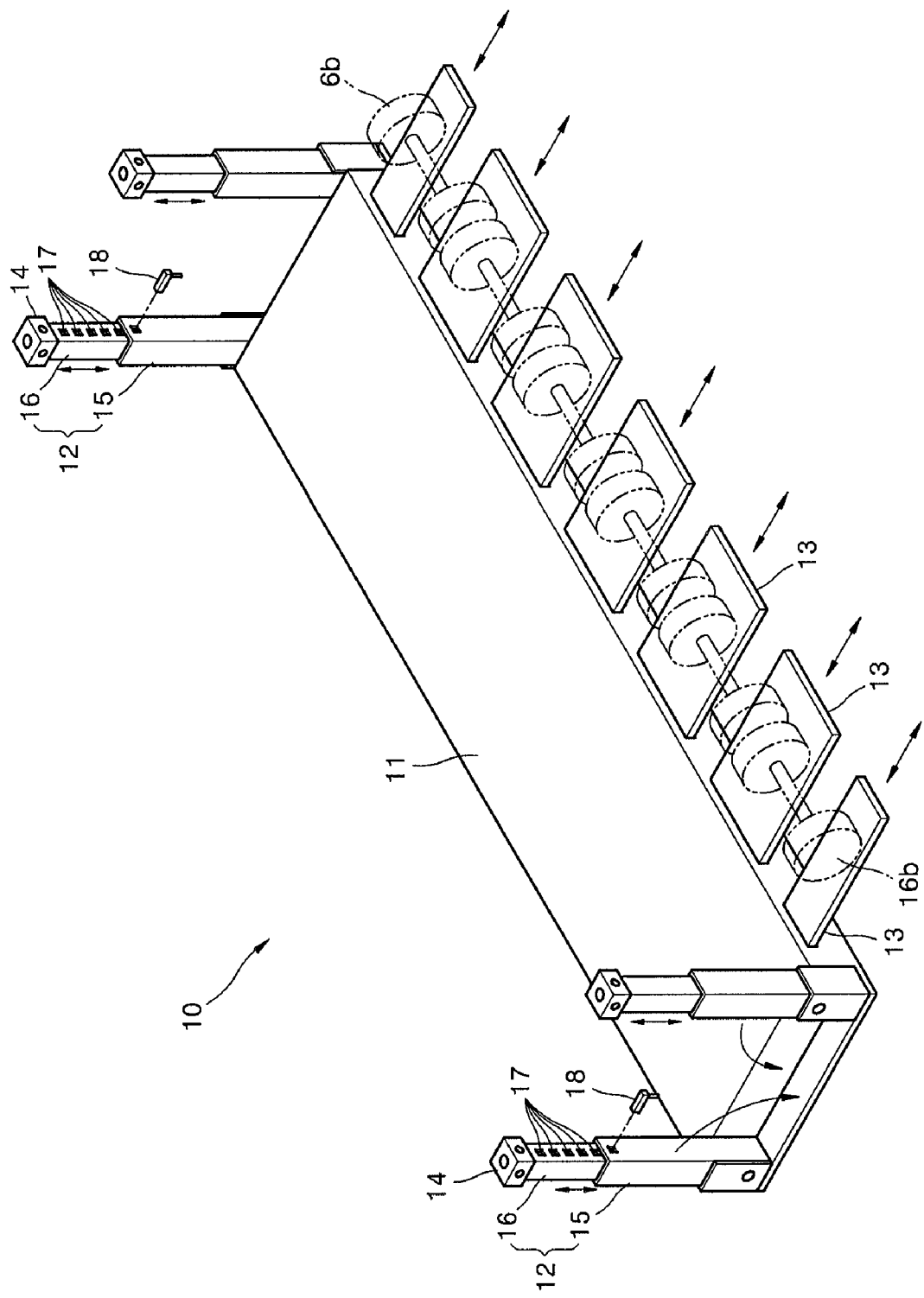
FIG. 9 is a perspective view of a container for shipping vehicles according to another embodiment of the present invention.

Meanwhile, the container 10 for shipping vehicles can be used as the container for general goods by increasing the heights of the support poles 12 as shown in FIGS. 7, 8, and 9. The height of the support pole 12 may be adjusted corresponding to the size of the general goods or the vehicles 6 that are to be loaded.

That is, each of the support poles 12 can include a fixed pole 15 installed on the bottom plate 11, and a movable pole 16 installed in the fixed pole 15 and guided by the fixed pole 15 to extend to a predetermined length or contract based on the fixed pole 15.

Here, referring to FIG. 9, the movable pole 16 can be fixed in the fixed pole 15 using a plurality of fixing holes 17 formed in the movable pole 16 and a fixing pin 18 penetrating the fixed pole 15. Otherwise, various fixing tools such as fixing bars or support bars can be used to fix the adjusted height of the support poles 12.

In addition, referring to FIG. 7, the height (h) of the support pole 12 can be reduced to correspond to the height of the loaded vehicles 6 so as to minimize the dead space. If specialized vehicles are loaded, the support poles 12 can extend to the height (h') that is higher than that of the conventional container.

Therefore, various standards of used cars, new cars, and specialized vehicles can be shipped using the container 10 for shipping vehicles of the current embodiment of the present invention. In particular, in the container 10 for shipping vehicles, the front wheels 6a of the vehicle 6 are mounted on the bottom plate 11 and the rear wheels 6b of the vehicle 6 are mounted on the extension plate 13. Since the extension plate 13 can be extended to match the length of the vehicle 6, long vehicles that occupy three sections of the container holder 2 can be loaded in the container 10 of the current embodiment besides the vehicles 6 shown in FIG. 6 occupying two sections of the container holder 2. Therefore, various kinds of vehicles can be loaded in the container 10 unlike the conventional container 1.

Meanwhile, the support poles 12 can be fixedly installed on the bottom plate 11 as shown in FIG. 7, however, the support poles 12 can be coupled to the bottom plate 11 using hinges so as to be folded in the width direction of the bottom plate 11 while overlapping with facing support poles 12, and thus, the volume of the container 10 can be reduced when it is not in use. Besides the above folding structure in the width direction of the bottom plate 11, the support poles 12 can be folded in various ways, and the folding structure of the support poles 12 can be variously modified by those who skilled in the art within the technical essence of the present invention.

Figure 13:
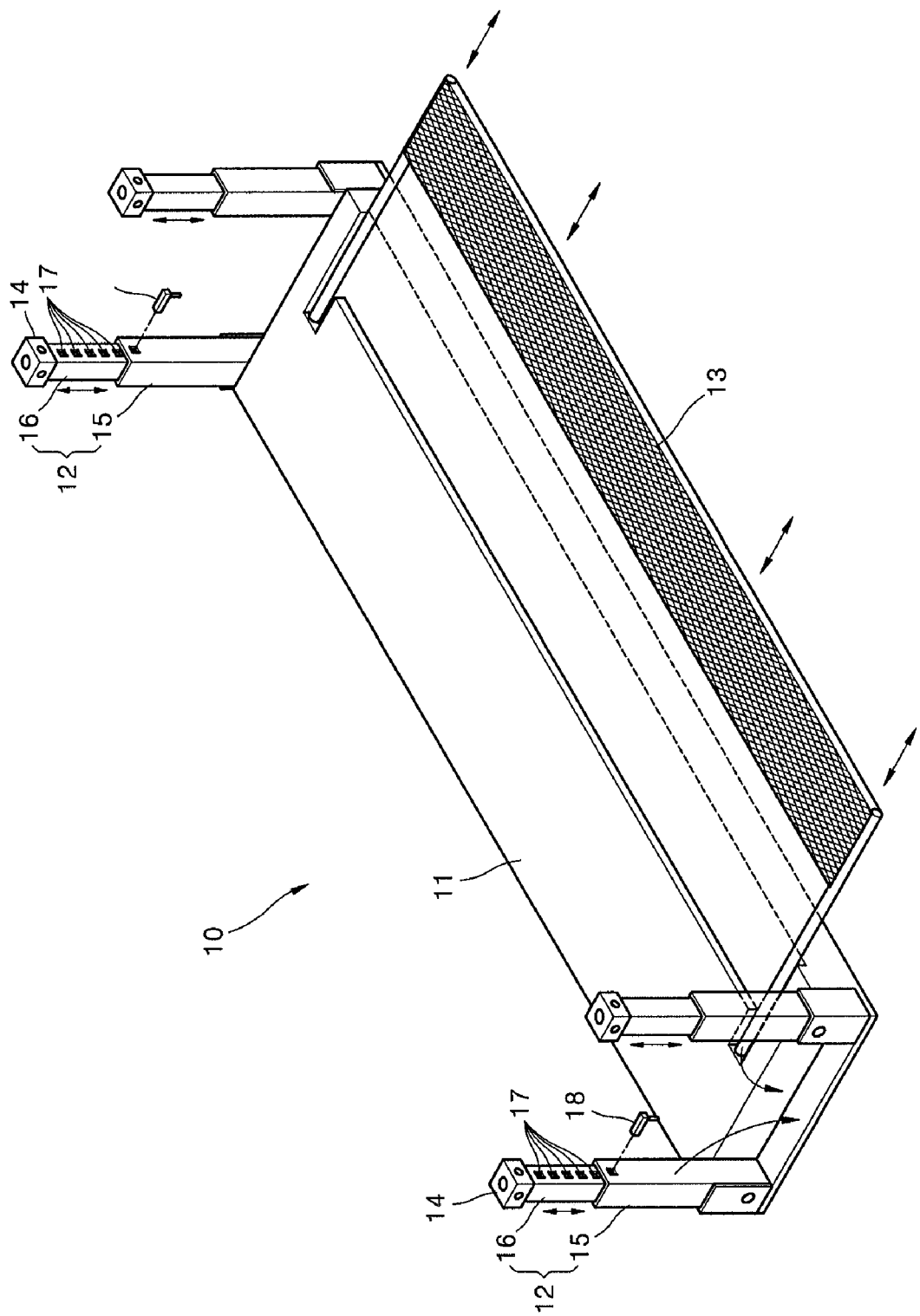
FIG. 13 is a perspective view of a container for shipping vehicles according to another embodiment of the present invention.
Figure 14:
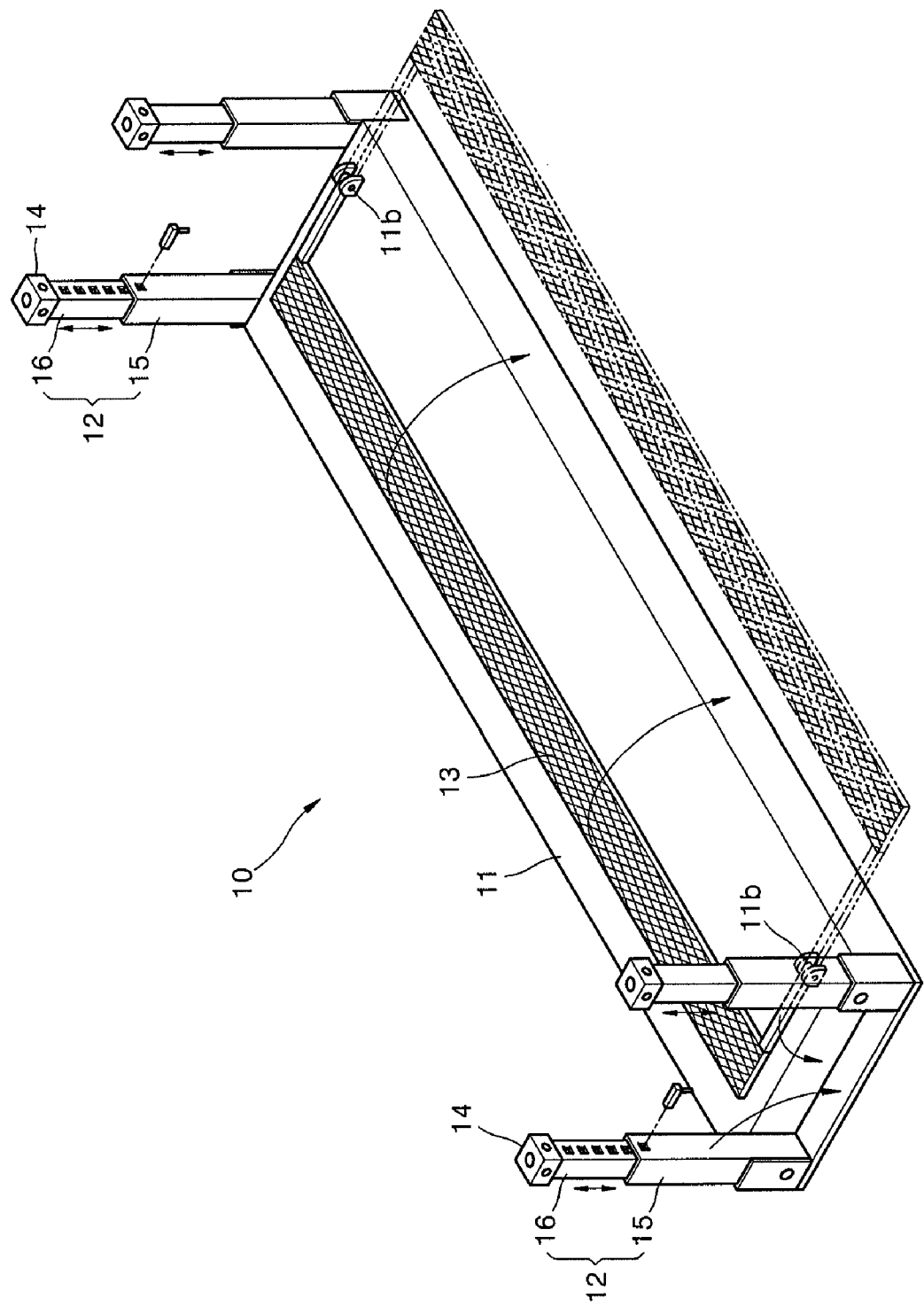
FIG. 14 is a perspective view of a container for shipping vehicles according to another embodiment of the present invention.

In addition, referring to FIGS. 7, 9, and 13, the extension plate 13 can be formed to slide along a guide recess 11a formed on the bottom plate 11 so as to be received in the bottom plate 11, or as shown in FIG. 14, the extension plate 13 can be coupled to the bottom plate 11 using a hinge to rotate based on a hinge shaft 11b so as to be folded on the bottom plate 11. Then, the volume of the container 10 can be reduced when it is not in use, and the container 10 can be also used as a container for general goods.

Figure 15:
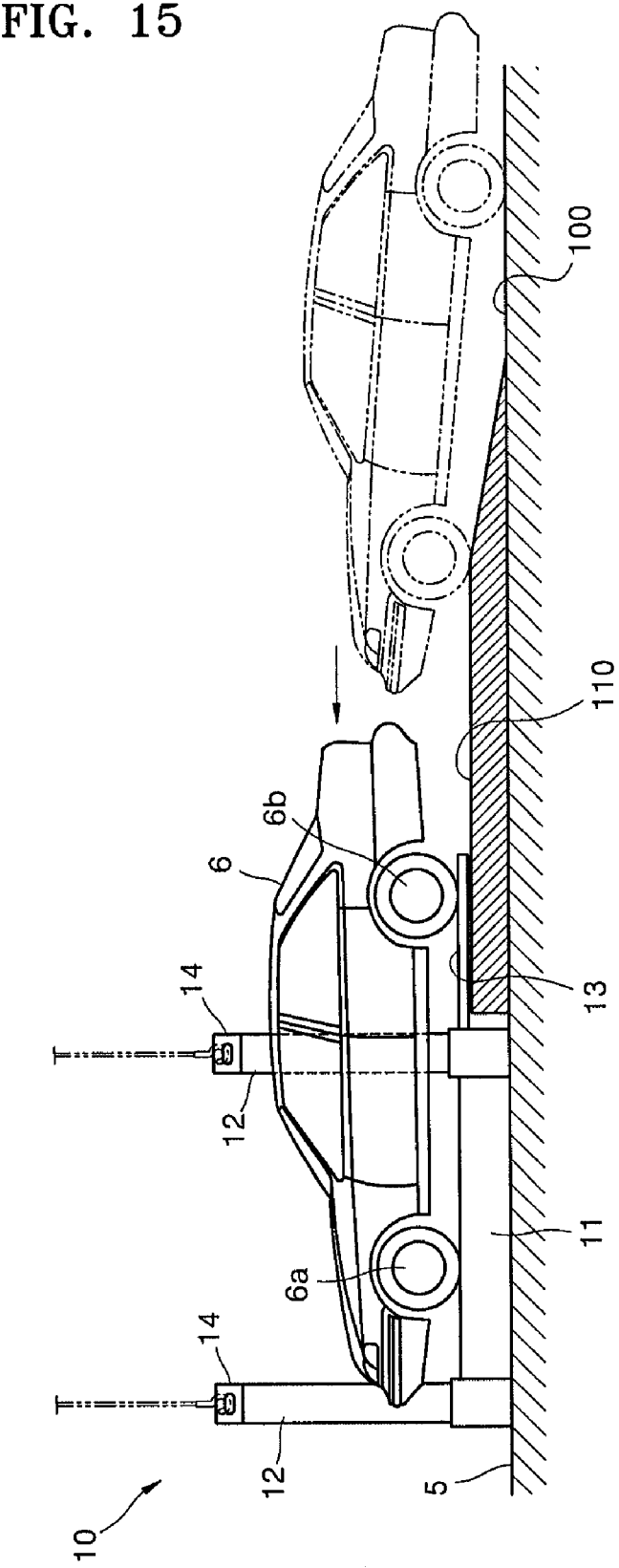
FIG. 15 is a front view of the container for shipping vehicles in a state where a vehicle is being loaded onto the container.

Therefore, as shown in FIG. 7, when the vehicles 6 are loaded, the extension plate 13 is drawn by sliding the extension plate 13, and when the container 10 is not used, the extension plate 13 is inserted into the bottom plate 11 by sliding the extension plate 13. In particular, referring to FIG. 9, a plurality of extension plates 13 corresponding to distances between the rear wheels 6b of differing vehicles 6 can be installed in the bottom plate 11. Otherwise, referring to FIG. 13, the extension plate 13 can be integrally formed regardless of the distances between the rear wheels 6b of the vehicles 6. Referring to FIG. 15, in order to load the vehicles 6 into the container 10, a slope step 110 corresponding to the height of the bottom plate 11 and the extension plate 13 is formed on the ground 100, and then, a driver can drive the vehicle 6 so that the front wheels 6a and the rear wheels 6b of the vehicle 6 can be located on the bottom plate 11 and on the extension plate 13 by using the slope step 110.

Therefore, it is easy to load or draw the vehicles 6 onto/from the container 10, and thus, the amount of operating workers and time required can be reduced greatly during loading/unloading of the vehicles 6. In addition, the containers 10 can be stacked in a multi-layered arrangement with the vehicles 6 loaded therein before loading/after unloading of the vehicles 6, and thus, the space required to keep the vehicles 6 before loading/after unloading the vehicles 6 can be greatly reduced.

Figure 10:
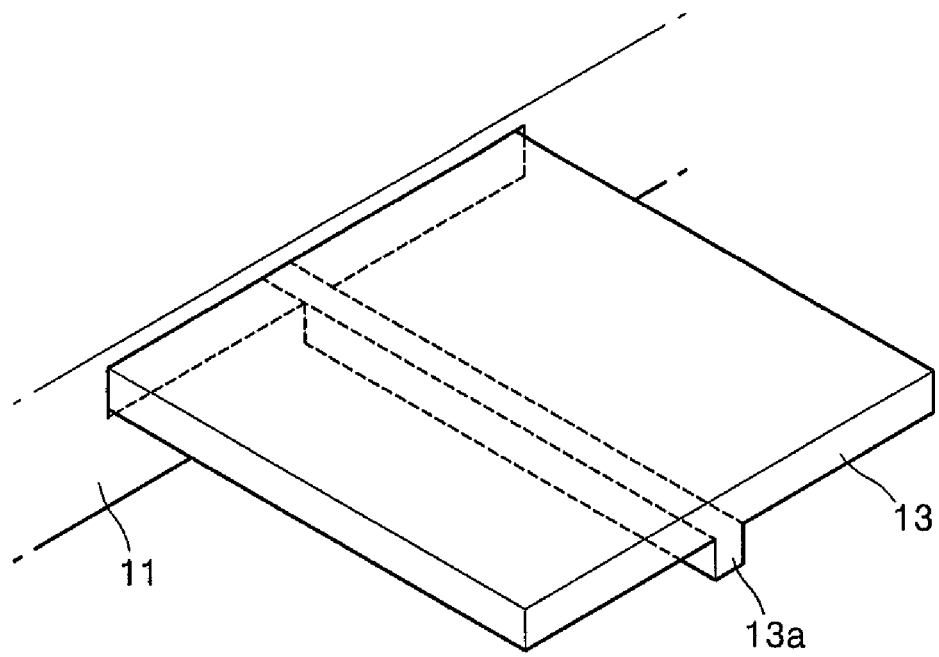
FIG. 10 is a perspective view showing an example of an extension plate shown in FIG. 9.

Meanwhile, referring to FIG. 10, the sliding type extension plate 13 can further include a thick reinforcing portion 13a in order to reinforce the strength of the extension plate 13.

Figure 11:
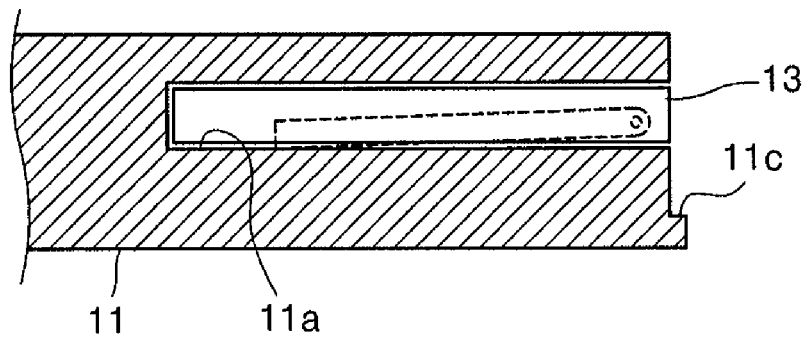
FIGS. 11 and 12 are cross-sectional views showing other examples of the extension plate of FIG. 9.
Figure 12:
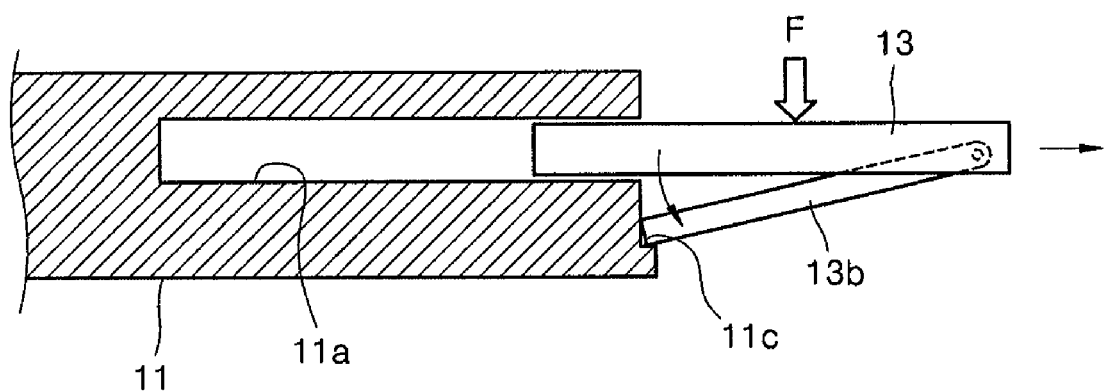

In addition, referring to FIGS. 11 and 12, a projection bar 13b may be installed in the extension plate 13, that is, an end portion of the projection bar 13b is coupled to the extension plate 13 using a hinge and can be stored in the bottom plate 11 with the extension plate 13. When the extension plate 13 is extended, the other end portion of the projection bar 13b is caught by a projection step 11c formed on the bottom plate 11 in order to support the extension plate 13.

The container for shipping vehicles according to the present invention is not limited to above embodiments, and can be modified by those skilled in the art within the technical scope of the present invention.

Figure 16:
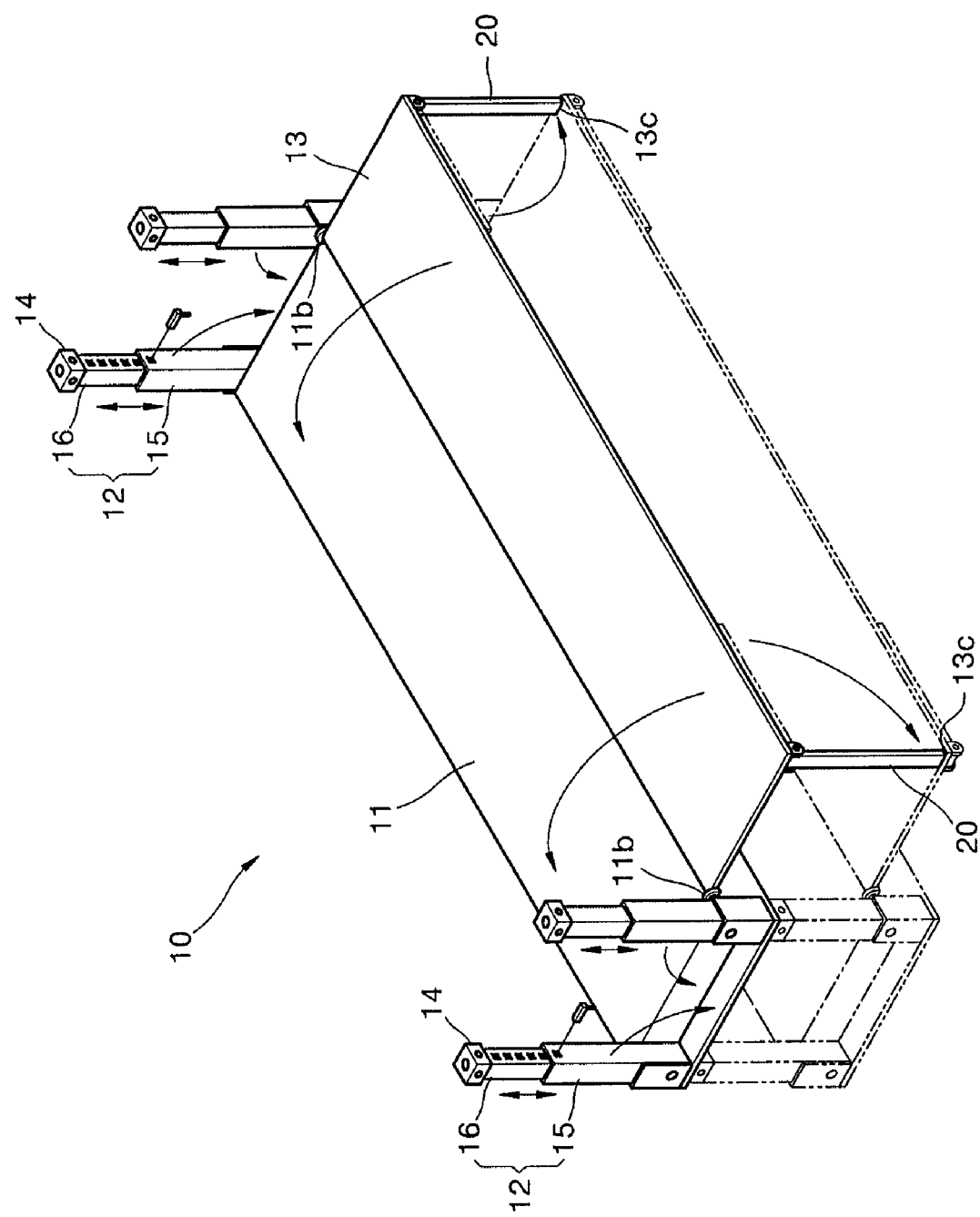
FIG. 16 is a perspective view of a container for shipping vehicles according to another embodiment of the present invention.

For example, referring to FIG. 16, additional support legs 20, lower ends of which are inserted into recesses 13c formed on the extension plate 13 of a lower container 10, can be coupled to the extension plate 13 using hinges in order to support the load of the vehicles 6. In addition, the container for shipping vehicles according to the present invention is not limited to examples shown in the drawings, and kinds, shapes, folding structures, and designs of the component in the container can be changed. Also, a new material having a high strength can be used to fabricate the container of the present invention, and various fixing members and actuators can be used to improve convenience in using the container.

While this invention has been particularly shown and described with reference to embodiments thereof, it will be understood by those skilled in the art that various changes in form and details may be made therein without departing from the spirit and scope of the invention as defined by the appended claims.

The invention claimed is:

1. A container for shipping vehicles, the container comprising:
    a bottom plate having a predetermined length and a predetermined width satisfying standards of a conventional container holder;
    support poles installed on four corners of the bottom plate, and including corner casts on upper portions thereof; and
    an extension plate extending from a side of the bottom plate and supporting vehicles so that vehicles can be loaded in the width direction of the bottom plate, wherein the extension plate is coupled to the bottom plate using a hinge so as to rotate and fold onto the top of the bottom plate.

2. The container of claim 1, wherein each of the support poles comprises: a fixed pole installed on the bottom plate; and a movable pole installed in the fixed pole, and guided by the fixed pole to extend to a desired length and contract based on the fixed pole.

3. The container of claim 1, wherein the support poles can be folded in the width direction of the bottom plate by being coupled to the bottom plate using hinges, and overlap with each other.

4. The container of claim 1, wherein the extension plate includes a thick reinforcing portion in order to reinforce the extension plate.

5. A container for shipping vehicles, the container comprising:
    a bottom plate having a predetermined length and a predetermined width satisfying standards of a conventional container holder;
    support poles installed on four corners of the bottom plate, and including corner casts on upper portions thereof; and
    an extension plate extending from a side of the bottom plate and supporting vehicles so that vehicles can be loaded in the width direction of the bottom plate, wherein the extension plate includes a projection bar, an end portion of which is coupled to the extension plate using a hinge, supporting the extension plate due to the other end of the projection bar making contact with a projection step when the extension plate is extended.

\* \* \* \* \*